United States Patent
Kimura et al.

(10) Patent No.: US 6,265,598 B1
(45) Date of Patent: Jul. 24, 2001

(54) PREPARATION OF HYDROLYZABLE GROUP END-BLOCKED ORGANOPOLYSILOXANE

(75) Inventors: Kenichi Kimura, Annaka; Masatoshi Miyake, Gunma-ken; Nobuhiko Kodana, Annaka, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/689,593

(22) Filed: Oct. 13, 2000

(30) Foreign Application Priority Data

Oct. 13, 1999 (JP) .................................................. 11-291021

(51) Int. Cl.$^7$ .................................. C07F 7/08; C07F 7/10
(52) U.S. Cl. ........................ 556/457; 556/422; 556/442; 556/450; 556/458; 528/18; 528/20; 528/21; 528/34
(58) Field of Search ..................................... 556/422, 442, 556/450, 457, 458; 528/18, 20, 21, 34

(56) References Cited

U.S. PATENT DOCUMENTS

| | | | |
|---|---|---|---|
| 4,658,006 | * | 4/1987 | Inoue ...................................... 528/34 |
| 5,223,636 | * | 6/1993 | Koshimura et al. .................. 556/457 |
| 5,605,997 | * | 2/1997 | Yamamoto et al. ............. 556/457 X |
| 5,739,246 | * | 4/1998 | Gralver et al. ...................... 528/18 X |
| 5,932,757 | * | 8/1999 | Standke et al. ....................... 556/457 |
| 6,069,259 | * | 5/2000 | Crivello ........................... 556/458 X |
| 6,127,502 | * | 10/2000 | Krahnke et al. ................. 556/458 X |

* cited by examiner

*Primary Examiner*—Paul F. Shaver
(74) *Attorney, Agent, or Firm*—Birch, Stewart, Kolasch & Birch, LLP

(57) ABSTRACT

A hydrolyzable group end-blocked organopolysiloxane is prepared by reacting (A) an organopolysiloxane having a silanol group at each end of its molecular chain with (B) an organosilicon compound having hydrolyzable groups or a partial hydrolyzate thereof in the presence of (C) a condensation catalyst. Use is made of a vibratory mixer comprising a conduit through which a fluid flows in an axial direction and an agitating element disposed in the conduit for reciprocal motion in the flow direction. A reactant mixture of necessary components is introduced into the conduit where the components are vibro-agitated by the agitating element while reaction takes place.

4 Claims, 1 Drawing Sheet

PREPARATION OF HYDROLYZABLE GROUP END-BLOCKED ORGANOPOLYSILOXANE

This invention relates to a method for preparing a hydrolyzable group end-blocked organopolysiloxane useful as the base fluid in room temperature curable organopolysiloxane compositions.

BACKGROUND OF THE INVENTION

In the prior art, a hydrolyzable group end-blocked organopolysiloxane is prepared by reacting an organopolysiloxane having a silanol group at each end of its molecular chain represented by the following general formula (1):

$$(HO)\text{—}(R_2SiO)_n\text{—}H \quad (1)$$

with an organosilicon compound of the following general formula (2):

$$(Z)_{4-a}SiR^1{}_a \quad (2)$$

or a partial hydrolyzate thereof in the presence of a condensation catalyst. The hydrolyzable group end-blocked organopolysiloxane thus obtained has the following general formula (3).

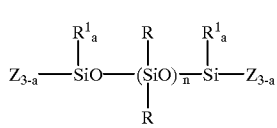

Herein, R is a substituted or unsubstituted monovalent hydrocarbon group, and n is such a number that the organopolysiloxane of formula (1) may have a viscosity of 10 to 1,000,000 centistokes at 25° C., Z is a hydrolyzable group, $R^1$ is a substituted or unsubstituted monovalent hydrocarbon group, and "a" is equal to 0 or 1.

The prior art method, however, suffers from several problems including a need of heating to high temperature and a long time of preparation taken until terminal silanol groups are blocked.

SUMMARY OF THE INVENTION

An object of the invention is to provide an improved method for preparing an organopolysiloxane of the above formula (3) briefly in a simple way, without a need for long-term heating to high temperature, and especially in a continuous manner.

The invention pertains to a method for preparing an organopolysiloxane of the above formula (3) by mixing an organopolysiloxane of the above formula (1) (referred to as major component) with an organosilicon compound of the above formula (2) or a partial hydrolyzate thereof serving as a curing agent, and optionally a condensation catalyst and a reaction aid. It has been found that this reaction can be promoted by using a mixer comprising a conduit through which a fluid flows in a direction and an agitator coupled to a vibrating drive and disposed in the conduit for reciprocal motion mainly in the flow direction. More particularly, use is made of a dynamic mixer comprising a conduit through which a fluid flows in an axial direction, a drive means for producing reciprocal motion, and a vibratory agitator including a shaft coupled to the drive means and extended through the conduit for reciprocal motion in the flow direction and one or more vibrating elements attached to the shaft. By reciprocal motion of vibrating elements at a high speed mainly in the flow direction, the minor components including the curing agent and catalyst can be uniformly mixed with the major component within a very short time in the compact conduit. Even when the major component is a silicone fluid having a relatively high viscosity, efficient dispersion is accomplished.

Accordingly, the invention provides a method for preparing a hydrolyzable group end-blocked organopolysiloxane by reacting (A) an organopolysiloxane having a silanol group at each end of its molecular chain represented by the following general formula (1):

wherein R, which may be the same or different, is a substituted or unsubstituted monovalent hydrocarbon group, and n is such a number as to give a viscosity of 10 to 1,000,000 centistokes at 25° C., with (B) an organosilicon compound of the following general formula (2):

$$(Z)_{4-a}SiR^1{}_a \quad (2)$$

wherein Z is a hydrolyzable group, $R^1$ is a substituted or unsubstituted monovalent hydrocarbon group, and "a" is equal to 0 or 1, or a partial hydrolyzate thereof, optionally in the presence of (C) a condensation catalyst, to form a hydrolyzable group end-blocked organopolysiloxane of the following general formula (3):

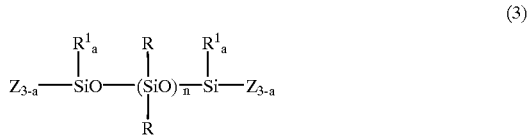

wherein R, $R^1$, Z, n and a are as defined above. The method involves the steps of furnishing a vibratory mixer comprising a conduit through which a fluid flows in a direction and an agitator disposed in the conduit for reciprocal motion in the flow direction, and introducing a reactant mixture comprising components (A) and (B) and optionally component (C) into the conduit of the vibratory mixer wherein the reactant mixture is vibroagitated by the agitator while reaction between components (A) and (B) takes place.

BRIEF DESCRIPTION OF THE DRAWING

The above and other objects, features and advantages of the invention will be better understood by reading the following description taken in conjunction with the accompanying drawing.

The only FIGURE.

DESCRIPTION OF THE PREFERRED EMBODIMENT

Figure 1:
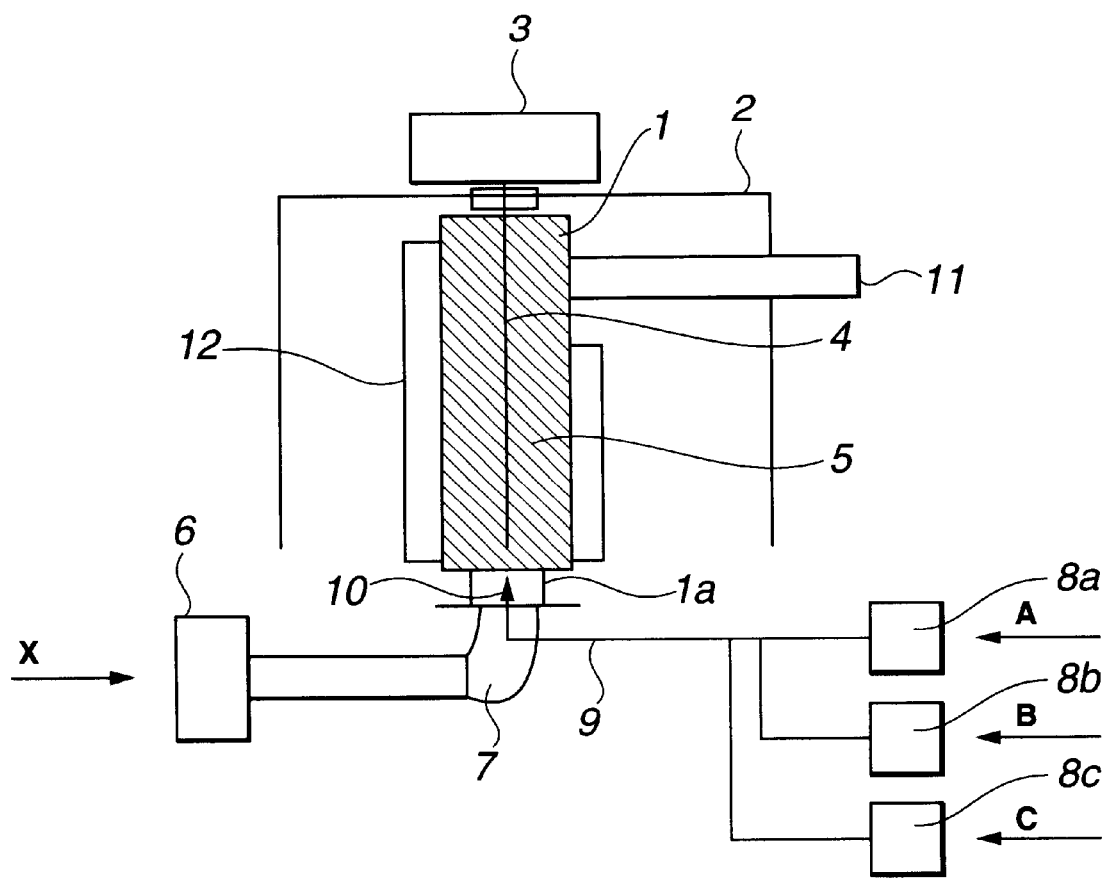
FIG. 1 is a block diagram of a reaction system used in the method of the invention.

The method for preparing a hydrolyzable group end-blocked organopolysiloxane of formula (3) according to the invention uses as one reactant (A) an organopolysiloxane of the following general formula (1).

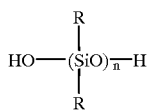
(1)

Herein R, which may be the same or different, stands for substituted or unsubstituted monovalent hydrocarbon groups, preferably having 1 to 10 carbon atoms, more preferably 1 to 8 carbon atoms. Illustrative examples of R include alkyl groups such as methyl, ethyl, propyl, butyl, and hexyl, aryl groups such as phenyl and tolyl, alkenyl groups such as vinyl, ally and butenyl, and aralkyl groups such as benzyl and 2-phenylethyl. Also included are substituted ones of the foregoing groups in which some or all of the hydrogen atoms attached to carbon atoms are replaced by halogen atoms, cyano groups or the like, for example, chloromethyl, trifluoropropyl and cyanoethyl. Of these, methyl, phenyl, ethyl, vinyl and trifluoropropyl are preferred, with methyl being especially preferred.

It is noted that n corresponds to a degree of polymerization and is such a number that the organopolysiloxane may have a viscosity of about 10 to 1,000,000 centistokes at 25° C., and preferably from the working standpoint, about 500 to 100,000 centistokes at 25° C.

Illustrative, non-limiting, examples of the organopolysiloxane of formula (1) are given below.

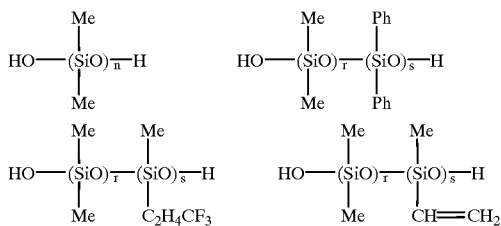

In the formulae, Me is methyl, Ph is phenyl, r and s are positive integers, and r+s is an integer corresponding to n.

Although the organopolysiloxane generally has silanol groups at both ends of its molecular chain, the polymer may be blocked at one end with 0 to 10% by weight of trimethylsilyl groups. It is also acceptable that the polymer contains in its structure 0 to 3 mol % of branching structural units as shown below.

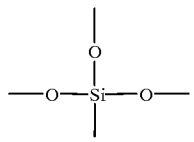

As another reactant, the method of the invention uses (B) an organosilicon compound of the following general formula (2) or a partial hydrolyzate thereof.

(2)

Herein $R^1$ stands for substituted or unsubstituted monovalent hydrocarbon groups, preferably having 1 to 18 carbon atoms, and more preferably 1 to 8 carbon atoms. Illustrative examples are alkyl, aryl, alkenyl and aralkyl groups as exemplified for R, and substituted ones of such groups in which some or all of the hydrogen atoms are replaced by halogen atoms, cyano groups or the like.

Z is a hydrolyzable group, examples of which include organoxy groups such as alkoxy groups of 1 to 8 carbon atoms, especially 1 to 3 carbon atoms, alkenyloxy groups and aryloxy groups, as well as acyloxy groups, ketoxime groups, aminoxy groups, and amido groups. Of these, alkoxy, acyloxy, alkenyloxy, and ketoxime groups are preferable. Acetoxy, methoxy, propenoxy and methyl ethyl ketoxime groups are especially preferred. It is noted that "a" is equal to 0 or 1.

Illustrative examples of the organosilicon compound include alkoxysilanes such as methyltrimethoxysilane, vinyltrimethoxysilane, phenyltrimethoxysilane, methyltriethoxysilane, tetramethoxysilane, tetraethoxysilane, tetrapropoxysilane, and 3-chloropropyltrimethoxysilane; enoxysilanes such as methyltriisopropenoxysilane, vinyltriisopropenoxysilane, phenyltriisopropenoxysilane, and tetratriisopropenoxysilane; ketoxime-silanes such as methyltris (methyl ethyl ketoxime)silane, vinyltris (methyl ethyl ketoxime)silane, phenyltris(methyl ethyl ketoxime)silane, methyltris (dimethyl ketoxime)silane, and tetrakis(methyl ethyl ketoxime)silane; acetoxysilanes such as methyltriacetoxysilane, vinyltriacetoxysilane, and ethyltriacetoxysilane; aminosilanes such as methyltris(N,N-diethylamino)silane and vinyltris(N,N-diethylamino)silane; amidosilanes such as methyltris(N-methylacetamido)silane; aminoxysilanes such as vinyltris(N-aminoxy)silane and vinyltris(N,N-diethylaminoxy)silane; cellosolve silanes such as methyltris(3-methoxypropylene glycoxy)silane, vinyltris(3-methoxypropylene glycoxy)silane, and phenyltris(3-methoxypropylene glycoxy)silane, and partial hydrolyzates thereof.

It is understood that the organosilicon compounds may be used alone or in admixture of two or more. For better durability, use of a single organosilicon compound is recommended.

The organosilicon compound or its partial hydrolyzate (B) is preferably blended in amounts of about 1 to 30 parts, especially about 3 to 10 parts by weight per 100 parts by weight of the organopolysiloxane (A). Less than 1 part of component (B) may be insufficient to block terminal silanol groups of component (A). More than 30 parts of component (B) may negate the subsequent use of the resulting organopolysiloxane as the base fluid.

In the practice of the invention, a condensation catalyst (C) is optionally used. Useful condensation catalysts include organic tin compounds such as dibutyltin dimethoxide, dibutyltin diacetate, dibutyltin dioctate, dibutyltin dilaurate, dimethyltin dimethoxide, and dimethyltin acetate; organic titanium compounds such as tetrapropyl titanate, tetrabutyl titanate, tetra-2-ethylhexyl titanate, and dimethoxytitanium diacetyl-acetonate; amine compounds such as hexylamine, 3-aminopropyltrimethoxysilane, and tetramethylguanidylpropyltrimethoxysilane, salts thereof and guanidine compounds. These compounds may be used alone or in combination of two or more.

The blocking of terminal silanol groups is possible without the condensation catalyst where Z in formula (2) is a ketoxime, acetoxy, aminoxy or amino group. The condensation catalyst is essential where Z is an alkenyloxy, alkoxy or 3-methoxypropyleneglycoxy group.

The amount of the condensation catalyst used is generally up to about 10 parts, preferably 0 to about 5 parts, more preferably about 0.001 to 3 parts, and especially about 0.01 to 1 part by weight per 100 parts by weight of the organopolysiloxane (A). Using more than 10 parts of the condensation catalyst gives no detrimental effects on the reaction process. However, when the resulting polymer is used as the base polymer of a room temperature curable organopolysiloxane composition, there arise many problems that the initial tack-free time becomes short, the storage stability becomes poor, the performance of cured product is exacerbated, as typified by poor fatigue durability of silicone rubber, and the sealant performance is exacerbated. When the condensation catalyst is used in conjunction with silanes having organoxy groups such as alkenyloxy and alkoxy groups and cellosolve silanes, the catalyst is preferably used in an amount of at least 0.001 part, especially at least 0.01 part by weight per 100 parts by weight of the organopolysiloxane (A). The preferred catalysts used in this case are guanidine compounds, tetraalkoxytitanium, and tetraalkoxyzirconium.

According to the invention, reaction between components (A) and (B) is effected within the vibratory mixer comprising the conduit through which reactants flow and the agitator disposed in the conduit for reciprocal motion in the flow direction. The vibratory mixer becomes most effective when component (A) or major component is reacted with such organosilicon compounds as silanes having organoxy groups such as alkenyloxy and alkoxy (e.g., methoxy) groups and cellosolve silanes, optionally in the presence of a minor amount of the condensation catalyst.

In the prior art, a static mixer is widely utilized as the mixer for mixing liquids in a closed conduit. The static mixer includes an agitator of a particular configuration disposed in a pipe through which liquids to be mixed flow. The agitator produces turbulent flow for promoting mixing of the liquids. As the liquids become thickened (i.e., increase the viscosity) during reaction, the static mixer fails to keep the liquids flowable and is clogged. For the mixing step with concomitant chemical reaction, the pipe must be several meters long in order to provide a sufficient reaction time.

In contrast, the mixer equipped with the vibratory agitator is successful in smoothly and efficiently carrying out the reaction between components (A) and (B). In the following description, the organopolysiloxane having a silanol group at each end of its molecular chain (A) is referred to as the "major component" while the term "auxiliary components" is used as encompassing the organosilicon compound (B), condensation catalyst (C) and other components.

The vibratory mixer includes a flow conduit having a supply port. A major component supply is connected to the flow conduit at the supply port. A nozzle for supplying the auxiliary components is disposed in the flow conduit at or near the supply port. Disposed in the flow conduit is a dynamic agitator including a drive for producing reciprocal motion, a shaft coupled to the drive, and a vibrating element or elements attached to the shaft. The vibrating element or elements are reciprocally moved in the flow direction. The mixer of this type may be selected from the mixers disclosed in U.S. Pat. No. 5,391,000, JP-A 3-258337 and JP-A 4-235729.

Referring to FIG. 1, an exemplary reaction system including such a mixer is illustrated. The system includes a vertical flow conduit 1 which serves as a mixing vessel and through which a fluid flows in an axial direction. The flow conduit 1 has an inlet port 1a at the bottom and an outlet port 1b near the top and is surrounded by a jacket 12 for heating the conduit. A drive motor 3 having a drive shaft 4 is secured to a stationary frame 2. Vibrating elements 5 are attached to the drive shaft 4 to construct an agitator, which is disposed in the flow conduit 1 for vertical reciprocal motion. The motor 3 operates to move the shaft 4 and vibrating elements 5 up and down. A main feed line 7 for feeding the major component X is connected at one end to a pump 6 and at another end to the inlet port 1a of the conduit 1. An auxiliary feed line 9 has sub-lines for feeding auxiliary components A, B and C through pumps 8a, 8b and 8c and also has a capillary nozzle 10 which is inserted into the main feed line 7. The major component X is fed from the feed line 7 to the flow conduit 1 via the inlet port 1a, and the auxiliary components A, B and C are fed through the auxiliary feed line 9 and discharged from the capillary nozzle 10 into the conduit 1 along with the major component X. In the flow conduit 1, the major component X is mixed with the auxiliary components A, B and C while they undergo reciprocal motion in the flow direction. The mixture is advanced upward and discharged from the outlet port to a discharge line 11.

The vibrating element does not rotate about the axis of the shaft, but moves back and forth in the axial direction or flow direction of the mixture. The vibrating element may be disposed at an angle, especially perpendicular to the material flow through the conduit or have a spiral structure as long as the vibrating element is not parallel to the material flow. The vibrating element generally takes the form of a plurality of axially spaced apart discs of a shape conformal to the inner shape of the flow conduit although such discs may be provided with notches and/or perforations. The vibrating element may consist of a single disc or a plurality of discs. A more number of discs achieves a greater mixing effect so that the reaction time is reduced. It is also effective that two or more vibrating discs are combined into one set and a plurality of disc sets are arranged at intervals. A greater than necessity number of discs may increase the flow resistance through the conduit and hence, the pressure loss thereacross. Also preferably the vibrating element is a helical one, and it is set at a spiral angle with respect to the axial or flow direction rather than at right angles because the flow resistance through the conduit can be reduced. A greater frequency of vibration achieves more efficient agitation. The frequency of vibration per minute is generally 10 to 10,000 strokes, more preferably 100 to 5,000 strokes and most preferably 500 to 2,000 strokes. The stroke of vibration is preferably 0.1 to 50 mm, and especially 0.5 to 10 mm. Advantageously for reducing the reaction time, the flow conduit is enclosed with the heating jacket for keeping the conduit at a temperature of 50 to 150° C.

If the reaction is not completed solely with the vibrating element, it is advantageous that the discharge line 11 is extended and equipped at the outlet with a valve or similar means for adjusting the discharge rate so that the flowing fluid may be kept under the same atmosphere and pressure as in the mixing conduit 1. The overall reaction time or residence time can be adjusted in terms of the diameter and length of the extended discharge line.

The organopolysiloxane of the above formula (3) thus obtained is advantageously used as the base fluid of room temperature-curable organopolysiloxane compositions. Such a room temperature-curable organopolysiloxane composition is formulated by using the organopolysiloxane as the base fluid and blending an organosilicon compound similar to component (B), a condensation catalyst similar to component (C), an inorganic filler and other additives. In the presence of moisture, the composition readily cures into a rubbery elastomer. The composition finds a wide variety of applications in adhesives, coating agents, electrical insulating sealants, building sealants, etc.

In the composition, a flow controlling agent known as an anti-sagging agent or thixotropy modifier is preferably blended for improving workability though not essential. An appropriate amount of anti-sagging agent used is about 0.01 to 10 parts, more preferably about 0.1 to 0.5 part by weight per 100 parts by weight of the base fluid. Commonly used anti-sagging agents are polyethers as typified by polyethylene oxide and polypropylene oxide and modified polyethers.

Other additives include pigments, dyes, anti-rusting agents, flame retardants, mildew-proofing agents, scavengers, discharge modifiers (e.g., low viscosity fluid, glass balloons, and non-silicone fluid), antioxidants, and adhesion promoters. These optical additives may be used in conventional amounts insofar as they do not compromise the benefits of the composition.

EXAMPLE

Examples of the invention are given below by way of illustration and not by way of limitation. Parts are by weight. The viscosity is a measurement at 25° C by a rotating viscometer.

The preparation of end-blocked fluids in Examples was carried out using the mixer shown in FIG. 1. The main feed line had an inner diameter of 50 mm, the auxiliary feed lines had an inner diameter of 4 to 10 mm, the mixing conduit had an inner diameter of 65 mm and a length of 500 mm, and the discharge line had an inner diameter of 50 mm. In the mixing conduit was inserted an agitator having a continuous spiral vibrating element secured to a shaft. The drive motor to which the shaft was coupled was operated to move the shaft up and down to generate vibration for mixing reaction.

Example 1

The pumps in the main and auxiliary feed lines were adjusted so as to feed 74 parts of α,ω-dihydroxydimethylpolysiloxane having a viscosity of 20,000 centistokes at 25° C., 6 parts of vinyltrimethoxysilane, and 0.1 part of tetraethoxytitanium, which were continuously fed into the mixing conduit. Within the mixing conduit, the agitator was reciprocally moved at a frequency of 1,500 strokes per minute and 900 strokes per minute over a stroke of 2 mm for effecting dynamic vibratory mixing. The residence time in the mixing conduit was 5 minutes. After one hour of continuous operation, the fluid was sampled out. Due to self heating during mixing, the interior temperature of the conduit rose to 95° C. A sample of the fluid was measured for viscosity.

Also, 100 parts of the fluid sample was blended with 10 parts of dry silica (Nippon Aerosil K.K.), 1 part of γ-aminopropyltriethoxysilane and 0.1 part of diethoxytin 2,4-pentadionate to formulate a rubber composition, which was measured for physical properties. The results are shown in Table 1.

Example 2

The pumps in the main and auxiliary feed lines were adjusted so as to feed 74 parts of α,ω-dihydroxydimethylpolysiloxane having a viscosity of 20,000 centistokes at 25° C., 6 parts of vinyltrimethoxysilane, and 0.1 part of tetraethoxytitanium, which were continuously fed into the mixing conduit. Within the mixing conduit, the agitator was reciprocally moved at a frequency of 1,500 strokes per minute for effecting dynamic vibratory mixing. The residence time in the mixing conduit was 1 minute. After one hour of continuous operation, the fluid was sampled out. Due to self heating during mixing, the interior temperature of the conduit rose to 92° C.

The sample was then processed as in Example 1.

Example 3

The pumps in the main and auxiliary feed lines were adjusted so as to feed 74 parts of α,ω-dihydroxydimethylpolysiloxane having a viscosity of 50,000 centistokes at 25° C. and 3 parts of methyltriacetoxysilane, which were continuously fed into the mixing conduit. Within the mixing conduit, the agitator was reciprocally moved at a frequency of 1,500 strokes per minute for effecting dynamic vibratory mixing. The residence time in the mixing conduit was 5 minutes. After one hour of continuous operation, the fluid was sampled out. Due to self heating during mixing, the interior temperature of the conduit rose to 60° C. A sample of the fluid was measured for viscosity.

Also, 100 parts of the fluid sample was blended with 10 parts of dry silica (Nippon Aerosil K.K.), 0.3 part of di-tert-butoxydiacetoxysilane and 0.1 part of diethoxytin 2,4-pentadionate to formulate a rubber composition, which was measured for physical properties. The results are shown in Table 1.

Example 4

The pumps in the main and auxiliary feed lines were adjusted so as to feed 74 parts of α,ω-dihydroxydimethylpolysiloxane having a viscosity of 50,000 centistokes at 25° C. and 4 parts of vinyltris(methyl ethyl trioxime)silane, which were continuously fed into the mixing conduit. Within the mixing conduit, the agitator was reciprocally moved at a frequency of 1,500 strokes per minute for effecting dynamic vibratory mixing. The residence time in the mixing conduit was 5 minutes. After one hour of continuous operation, the fluid was sampled out. Due to self heating during mixing, the interior temperature of the conduit rose to 55° C. A sample of the fluid was measured for viscosity.

Also, 100 parts of the fluid sample was blended with 10 parts of dry silica (Nippon Aerosil K.K.), 1 part of γ-aminopropyltriethoxysilane and 0.1 part of dibutyltin dilaurate to formulate a rubber composition, which was measured for physical properties. The results are shown in Table 1.

Example 5

The pumps in the main and auxiliary feed lines were adjusted so as to feed 74 parts of α,ω-dihydroxydimethylpolysiloxane having a viscosity of 700 centistokes at 25° C. and 6 parts of tetramethoxysilane, which were continuously fed into the mixing conduit. Within the mixing conduit, the agitator was reciprocally moved at a frequency of 1,500 strokes per minute for effecting dynamic vibratory mixing. The residence time in the mixing conduit was 5 minutes. After one hour of continuous operation, the fluid was subjected to vacuum debubbling/mixing at 150° C. and 1 Torr for one hour for removing the excessive curing agent and methanol. A sample of the fluid was measured for viscosity.

Also, 100 parts of the fluid sample was blended with 10 parts of dry silica (Nippon Aerosil K.K.), 1 part of γ-aminopropyltriethoxysilane and 0.1 part of tetra-tert-butoxytin to formulate a rubber composition, which was measured for physical properties. The results are shown in Table 1.

Example 6

The pumps in the main and auxiliary feed lines were adjusted so as to feed 74 parts of α,ω-dihydroxydimethyl-polysiloxane having a viscosity of 20,000 centistokes at 25° C., 5 parts of vinyltris(propenoxy)silane and 0.5 part of tetramethylguanidylpropyltrimethoxysilane, which were continuously fed into the mixing conduit. Within the mixing conduit, the agitator was reciprocally moved at a frequency of 1,500 strokes per minute for effecting dynamic vibratory mixing. The residence time in the mixing conduit was 5 minutes. After one hour of continuous operation, the fluid was sampled out. Due to self heating during mixing, the interior temperature of the conduit rose to 55° C. A sample of the fluid was measured for viscosity.

Also, 100 parts of the fluid sample was blended with 10 parts of dry silica (Nippon Aerosil K.K.), 1 part of γ-aminopropyltriethoxysilane and 0.1 part of dibutyltin dilaurate to formulate a rubber composition, which was measured for physical properties. The results are shown in Table 1.

Comparative Example 1

To a batchwise mixer, 74 parts of the major component having a viscosity of 20,000 centistokes, 6 parts of vinylt-rimethoxysilane and 0.1 part of tetraethoxytitanium were fed. The mixer used was a versatile mixer of the double planetary blade type. The mixer was operated at 30 spins per minute and 15 revolutions per minute. Samples were taken out after 30, 60, 90 and 120 minutes. Due to self heating during mixing, the interior temperature of the conduit rose to 55° C.

The samples were then processed as in Example 1. The results are shown in Table 2.

Comparative Example 2

To a batchwise mixer, 74 parts of the major component having a viscosity of 20,000 centistokes, 6 parts of vinyltrimethoxysilane, 20 parts of a diluting functional group-free silicone fluid having a viscosity of 100 centistokes and 0.1 part of tetraethoxytitanium were fed. The mixer used was a versatile mixer of the double planetary blade type. The mixer was operated at 30 spins per minute and 15 revolutions per minute. Samples were taken out after 60 and 120 minutes. Due to self heating during mixing, the interior temperature of the conduit rose to 40° C.

The samples were then processed as in Example 1. The results are shown in Table 2.

TABLE 1

| | Example | | | | | | |
|---|---|---|---|---|---|---|---|
| | 1 | 2 | 3 | 4 | 5 | 6 | |
| Frequency | 900 | 1500 | 1500 | 1500 | 1500 | 1500 | 1500 |
| Fluid | | | | | | | |
| Initial viscosity (poise) | 200 | 70 | 1000 | 90 | 80 | 90 | 100 |
| Viscosity after 3 min. (poise) | 90 | 70 | 280 | 80 | 80 | 90 | 100 |
| Viscosity after 10 min. (poise) | 70 | 70 | 100 | 80 | 70 | 90 | 100 |
| Composition | | | | | | | |
| Tack-free time (min) | 4 | 4 | 4 | 4 | 4 | 5 | 4 |
| Slump (mm) | 0 | 0 | 0 | 0 | 0 | 0 | 0 |
| Discharge (g) | 43 | 45 | 40 | 40 | 45 | 41 | 41 |

TABLE 1-continued

| | Example | | | | | |
|---|---|---|---|---|---|---|
| | 1 | 2 | 3 | 4 | 5 | 6 |
| Hardness (JIS-A) | 34 | 38 | 22 | 38 | 38 | 38 | 39 |
| Tensile strength (kg/cm²) | 20 | 22 | 18 | 22 | 22 | 21 | 22 |
| Elongation (%) | 510 | 530 | 500 | 510 | 530 | 500 | 500 |
| Tear strength (kg/cm) | 15 | 20 | 14 | 20 | 20 | 19 | 20 |

TABLE 2

| | Comparative Example | | | | |
|---|---|---|---|---|---|
| | 1 | | | 2 | |
| Sampling time (min) | 30 | 60 | 90 | 120 | 60 | 120 |
| Fluid's initial viscosity (poise) | 2220 | rubbery | 5000 | 200 | 12000 | 200 |
| Composition | | | | | | |
| Tack-free time (min) | not | 180 | 8 | 5 | 8 | 5 |
| Slump (mm) | gel-like | dropped | 1 | 0 | 1 | 0 |
| Discharge (g) | compo- | 23 | 27 | 30 | 28 | 40 |
| Hardness, (JIS-A) | sition | 5 | 12 | 18 | 14 | 20 |
| Tensile strength (kg/cm²) | | 0 | 9 | 15 | 9 | 18 |
| Elongation (%) | | 630 | 580 | 510 | 550 | 480 |
| Tear strength (kg/cm) | | 0 | 9 | 12 | 10 | 14 |

With the method of the invention, a hydrolyzable group end-blocked organopolysiloxane of consistent high quality can be continuously produced through simple steps, with an inexpensive apparatus, within a very short reaction time, and in an efficient manner.

Japanese Patent Application No. 11-291021 is incorporated herein by reference.

Reasonable modifications and variations are possible from the foregoing disclosure without departing from either the spirit or scope of the present invention as defined by the claims.

What is claimed is:

1. A method for preparing a hydrolyzable group end-blocked organopolysiloxane by reacting (A) an organopolysiloxane having a silanol group at each end of its molecular chain represented by the following general formula (1):

(1)

wherein R, which may be the same or different, is a substituted or unsubstituted monovalent hydrocarbon group, and n is such a number as to give a viscosity of 10 to 1,000,000 centistokes at 25° C., with (B) an organosilicon compound of the following general formula (2):

$(Z)_{4-a}SiR^1_a$ (2)

wherein Z is a hydrolyzable group, $R^1$ is a substituted or unsubstituted monovalent hydrocarbon group, and "a" is equal to 0 or 1, or a partial hydrolyzate thereof, optionally in the presence of (C) a condensation catalyst, to form a hydrolyzable group end-blocked organopolysiloxane of the following general formula (3):

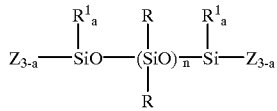

(3)

wherein R, $R^1$, Z, n and a are as defined above, said method comprising the steps of:

furnishing a vibratory mixer comprising a conduit through which a fluid flows in a direction and an agitator disposed in the conduit for reciprocal motion in the flow direction, and introducing a reactant mixture comprising components (A) and (B) and optionally component (C) into the conduit of said vibratory mixer wherein the reactant mixture is vibro-agitated by the agitator while reaction between components (A) and (B) takes place.

2. The method of claim 1 which is a continuous method.

3. The method of claim 1 wherein R in formula (1) is methyl group.

4. The method of claim 1 wherein Z in formula (1) is selected from the group consisting of alkoxy groups, acyloxy groups, alkenyloxy groups and ketoxime groups.

* * * * *